United States Patent [19]
Hoffman

[11] Patent Number: 6,061,702
[45] Date of Patent: *May 9, 2000

[54] RANDOM NUMBER GENERATOR

[75] Inventor: Eric J. Hoffman, Chandler, Ariz.

[73] Assignee: Intel Corporation, Santa Clara, Calif.

[ * ] Notice: This patent is subject to a terminal disclaimer.

[21] Appl. No.: 08/939,804

[22] Filed: Sep. 30, 1997

Related U.S. Application Data

[63] Continuation-in-part of application No. 08/648,553, May 15, 1996, Pat. No. 5,706,218.

[51] Int. Cl.[7] .................................................. G06F 7/58
[52] U.S. Cl. ............................ 708/251; 708/253; 331/78
[58] Field of Search ................................... 708/251, 253; 331/78; 380/46

[56] References Cited

U.S. PATENT DOCUMENTS

| | | | |
|---|---|---|---|
| 3,790,768 | 2/1974 | Chevalier et al. | 364/717 |
| 4,578,649 | 3/1986 | Shupe | 331/78 |
| 4,694,412 | 9/1987 | Domenik et al. | 364/717 |
| 4,791,594 | 12/1988 | Harney et al. | 364/717 |
| 4,810,975 | 3/1989 | Dias | 331/78 |
| 4,855,690 | 8/1989 | Dias | 331/78 |
| 5,007,087 | 4/1991 | Bernstein et al. | 380/46 |
| 5,057,907 | 10/1991 | Ooi et al. | 357/80 |
| 5,229,916 | 7/1993 | Frankeny et al. | 361/386 |
| 5,517,754 | 5/1996 | Beilstein, Jr. et al. | 29/840 |
| 5,530,623 | 6/1996 | Sanwo et al. | 361/788 |
| 5,627,775 | 5/1997 | Hong et al. | 364/717 |

OTHER PUBLICATIONS

An LSI Random Number Generator (RNG), Published in proc. Advances in Cryptology Conference on Crypto, Fairfield et al., 1984, pp. 203–215.

*Primary Examiner*—David H. Malzahn
*Attorney, Agent, or Firm*—Blakely, Sokoloff, Taylor & Zafman LLP

[57] ABSTRACT

A random number generator using, for example, a voltage controlled oscillator (VCO) which receives a noise input and at least one differential oscillator. The differential oscillator(s) provided oscillator signals to a differential sense amplifier which is sampled under control of the VCO.

35 Claims, 5 Drawing Sheets

RANDOM NUMBER GENERATOR

CROSS-REFERENCES TO RELATED APPLICATIONS

This is a continuation-in-part of Ser. No. 08/648,553 filed May 15, 1996, now a U.S. Pat. No. 5,706,218 which is owned by Assignee of the present Application.

BACKGROUND OF THE INVENTION

1. Field of the Invention

The invention relates to the field of random number generators.

2. Prior Art

Circuits for generating random numbers, or more accurately, pseudo random numbers are well-known in the art. One such circuit using a slow oscillator and fast oscillator is disclosed in U.S. Pat. No. 4,694,412. Other pseudo random number generators are described in U.S. Pat. Nos. 5,007,087 and 4,855,690. Systems for scrambling bits are also known such as shown in U.S. Pat. No. 4,791,594.

In "*An LSI Random Number Generator (RNG)*", published in Proc. Advances in Cryptology Conference on CRYPTO, 1984 by Fairfield, Mortenson and Coulthart, a slow and a fast oscillator are used where the natural variation in frequency of the slow oscillator is relied upon for developing the random signal. As will be seen the present invention improves upon this circuit.

SUMMARY OF THE INVENTION

A circuit for generating a random number is disclosed which utilizes a differential oscillator and a differential sense amplifier. The differential sense amplifier, controlled by a digital waveform source, receives an output from the differential oscillator to produce a random bit value.

DETAILED DESCRIPTION OF THE PRESENT INVENTION

A random number generator is described which includes a robust circuit utilizing differential signaling. In the following description numerous specific details are set forth such as specific oscillator frequencies, in order to provide a thorough understanding of the present invention. It will be obvious to one skilled in the art that the present invention may be practiced without these specific details. In other instances, well-known circuits are shown in block diagram form in order not to obscure the present invention.

Herein, a number of terms and symbols are frequently used to describe certain hardware and characteristics. For example, a "line" is broadly defined as one or more information-carrying mediums (e.g., electrical wire, bus trace, fiber optic), or a wireless communication channel (e.g., infrared "IR" link or radio frequency "RF" link). The terms "strengthen" and "weaken" (and related tenses) broadly define whether a device (e.g., transistor) is becoming more conductive and less conductive, respectively.

Figure 1:
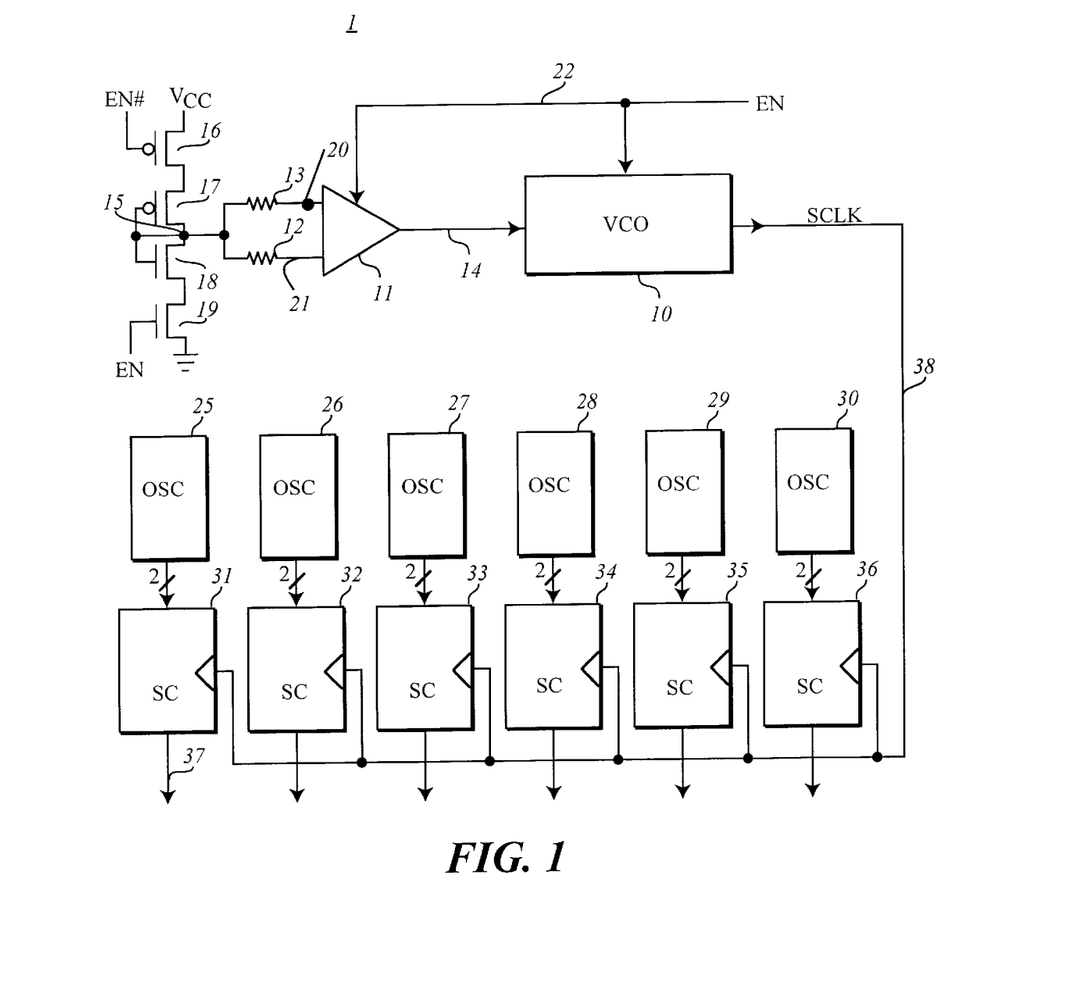
FIG. 1 is a block diagram of one embodiment of the present invention.

Referring now to FIG. 1, a random number generator 1 includes a relatively low frequency voltage controlled oscillator (VCO) 10 which is used to control sampling of a plurality of high frequency oscillators (OSC) 25–30. The use of a single VCO 10 may be advantageous because a low speed oscillator may require more substrate area than the higher speed oscillators 25–30.

In one embodiment, VCO 10 operates at a nominal frequency of approximately 1 megahertz (MHz). The operational frequency of VCO 10 is controlled by a signal on line 14. This signal is developed by a source of noise, and consequently, the output of VCO 10 via line 38 provides a signal SCLK which varies as a function of the noise on line 14. The output of VCO 10 may be defined by a Schmidt Trigger as is often done to provide a well-defined square wave.

A voltage divider, comprising a number of p-channel transistors 16 and 17 and n-channel transistors 18 and 19, provides a voltage at node 15. Node 15 is connected to an amplifier 11 through resistors 12 and 13. The amplifier 11 amplifies the difference in voltage between nodes 20 and 21 to provide the signal on line 14. This difference is created from thermal noise in resistors 12 and 13. An enable signal (EN) is applied to the gate of the n-channel transistor 19 and the complement of the enable signal (EN#) is applied to the gate of p-channel transistor 16. These transistors are used to power down the voltage divider.

In one embodiment, both resistors 12 and 13 are fabricated from a n-well and have an impedance of approximately 50 kilo-ohms (KΩ) with a selected tolerance. These resistors 12 and 13 are connected to high impedance nodes within amplifier 11, and consequently, noise from these resistors 12 and 13 is amplified by amplifier 11. The n-well resistors 12 and 13 provide considerable noise, and in a typical application, the signal on line 14 which in one embodiment is nominally 2 volts (V), varies randomly by ±0.5 millivolts (mV). Consequently, the frequency of the signal on line 38 randomly varies. Of course, any other type of digital waveform source providing a signal with non-deterministic arrival times of its edges along line 38 may be substituted for the present mechanism.

Both amplifier 11 and VCO 10 receive an enable signal on line 22 so that these devices may be powered down when not in use.

In one embodiment, the entire random number generator of FIG. 1 is fabricated employing well-known complementary-metal-oxide-semiconductors (CMOS) technology. The VCO 10 and amplifier 11 may be any one of a plurality of well-known circuits fabricated with CMOS technology. Such fabrication may occur on a single die or on multiple dice interconnected together. The multiple dice embodiment may be used for a multi-chip module architecture. It is contemplated, however, that the random number generator may be fabricated using bipolar technology or any other fabrication technology, or may be designed using discrete components.

A plurality of oscillators 25, 26, 27, 28, 29 and 30 are used in the embodiment of FIG. 1. Each oscillator is fabricated as a N-stage differential oscillator ("N" represents a positive whole number) which provides a number of advantages. One advantage is that differential signals are easier to sample than single-ended signals. For example, a high-speed ring oscillator produces a resultant signal having a voltage which can be interpreted as a logic 1 value (1) or logic 0 value (0). Usually, the resultant signal will not be a rail-to-rail signal, ranging from a first voltage level (e.g., $V_{dd}$) to a second voltage level (e.g., $V_{ss}$). Variation in these single levels will occur due to process, temperature and power supply variations. In a single-ended system, this causes a weighted discrepancy in generating random bits having more 1s or more 0s.

With a differential signal, these variations affect the signal and its complement equally. Hence, the sampled data which is a function of the difference is unchanged.

Another advantage is that differential oscillators will be able to mitigate solo generated noise. As a result, oscillators 25–30 would utilize smaller power supply decoupling capacitors or possibly no decoupling capacitors at all. Thus, the oscillators would not be required to be as isolated from each other. Such isolation is intended to mitigate lock condition caused by coupling through the power supply or the substrate. Consequently, the random number generator would require less die area.

The output of each of the oscillators 25–30 is connected to input terminals of a corresponding sampling circuit (SC) 31, 32, 33, 34, 35 and 36, respectively. In one embodiment, each sampling circuit 31–36 includes a master device and a slave device. An example of the master device includes, but is not limited or restricted to, a differential sense amplifier which receives a differential signal from its corresponding oscillator. An example of the slave device includes, but is not limited or restricted to, a standard CMOS latch such as a conventional D-type latch having an enable input. As shown, the clock terminals of sampling circuits 31–36 are connected to line 38, and consequently, sampling circuits 31–36 sample the output of their respective oscillators 25–30 at a frequency determined by the SCLK signal from VCO 10.

The output of each of the sampling circuits (e.g., Q terminal) is connected to an output line such as line 37 for sampling circuit 31. Circuits used by each oscillator and corresponding sampling circuit are described in FIGS. 2–4. These circuits provide a robust random number generator which is not biased in such a way as to favor either a 1 or 0 value.

For the circuit of FIG. 1, oscillators 25–30 provide asynchronous differential oscillation signals to their respective sampling circuits 31–36, respectively. Moreover, while each of the oscillators 25–30 is designed to have a nominal frequency, approximately 1 gigahertz (GHz) for example, each will have a somewhat different nominal frequency because of minor device size differences and tolerances typically found in the design of such oscillators. Consequently, even though each of the oscillators 25–30 is sampled simultaneously under the control of the signal on line 38, the samples will not be the same. Additionally, since the frequency of the signal on line 38 is varying because of the noise of resistors 12 and 13, the outputs from the sampling circuits 31–36 will be random.

It is contemplated that the embodiment of FIG. 1 utilizes six (6) oscillators to provide six (6) random bits at a time. This number, however, is not critical to the present invention. Typically, the number of oscillators will be determined by the rate at which the random bits are needed. Thus, the present invention could be accomplished with a random number generator having a single oscillator and sampling circuit or multiple oscillator and sampling circuit pairs as shown.

Figure 2:
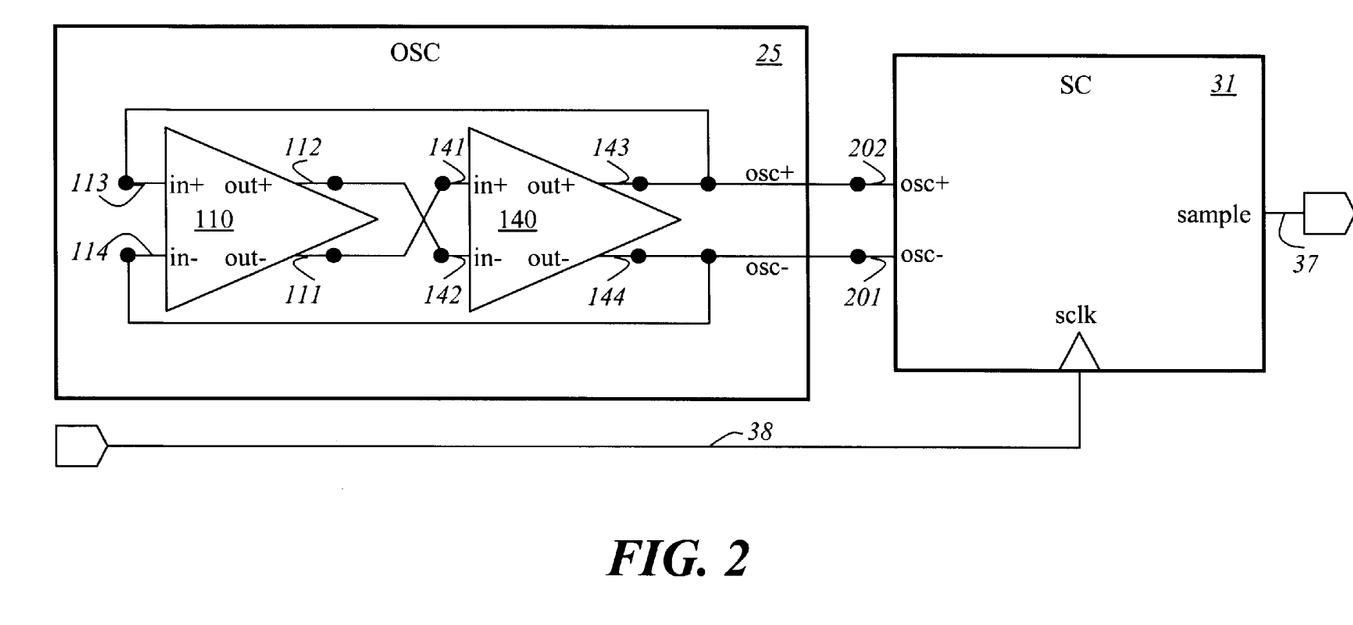
FIG. 2 illustrates in block diagram form a N-stage differential oscillator of one embodiment of the present invention.

Referring now to FIG. 2, an embodiment of a 2-stage (N=2) differential oscillator (e.g., oscillator 25) is shown. A negative output 111 of a first stage 110 is connected to a positive input 141 of a second stage 140 of the differential oscillator 25. Likewise, a positive output 112 of first stage 110 is connected to a negative input 142 of second stage 140. These stages 110 and 140 are cascaded to produce a first oscillation (OSC+) signal and a second oscillation (OSC–) signal. The outputs of oscillator 25, namely the positive output 143 providing OSC+ signal and the negative output 144 provides OSC– signal of second stage 140, are connected to both positive and negative inputs 113 and 114 of first stage 110. The positive and negative outputs 143 and 144 are further connected to positive and negative inputs 202 and 201 of a corresponding sampling circuit, such as sampling circuit 31 of FIG. 1. Sampling circuit 31 is clocked by line 38 from the VCO to generate a random bit over line 37.

Figure 3:
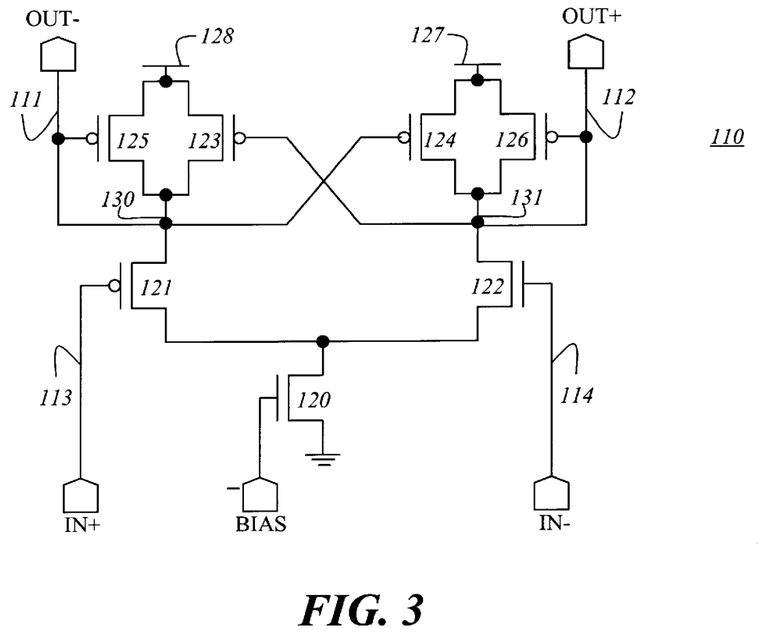
FIG. 3 is an illustrative embodiment of a stage of the differential oscillator of FIG. 2.

Referring now to FIG. 3, an embodiment of any stage (e.g., the first stage 110) of the differential oscillator in accordance with CMOS logic is shown. Stage 110 includes a plurality of n-channel devices 120, 121 and 122 and a plurality of p-channel devices 123 and 124. Collectively, these devices 120–124 form a cross-coupled differential amplifier. Additional p-channel devices 125 and 126 provide a negative feedback that limits the gain of the amplifier. Thus, oscillators of different frequencies can be produced by varying the strength of p-channel devices 125 and 126. For example, if p-channel devices 125 and 126 are relatively weak by providing minimal negative feedback with respect to the positive feedback applied by p-channel devices 123 and 124, respectively, the oscillator will be of a greater magnitude but of a slower frequency. Conversely, if p-channel devices 125 and 126 are relatively strong by providing substantial negative feedback with respect to the positive feedback applied by p-channel devices 123 and 124, respectively, the oscillations will be of a smaller magnitude but higher frequency.

More specifically, as shown in FIG. 3, in one embodiment of the present invention, n-channel device 120 is held at a generally constant voltage, which is less than $V_{dd}$, by a bias input applied to the gate of n-channel device 120. This provides a current source in order to sink current flowing through n-channel devices 121 and 122. As a result, the voltages on positive input 113 and negative input 114 may be used to adjust the voltages at nodes 130 and 131, respectively. For example, an increase in voltage of input 113 corresponds to an increase in gate voltage of n-channel device 121. This causes a decrease in voltage at node 130 as n-channel device 121 continues to become more conductive. Likewise, a decrease in voltage of input 114 corresponds to a decrease in gate voltage associated with n-channel device 122. This causes an increase in voltage at node 131 because n-channel device 122 is becoming less conductive.

Continuing this illustrative example, a decrease in voltage at node 130 strengthens p-channel device 124 because device 124 is becoming more conductive (turning-on more). This causes the voltage at node 131 to increase due to greater contribution by pull-up 127, and consequently, the positive output 112 of first stage 110 increases in voltage. In addition, an increase in voltage at node 131 weakens p-channel device 123 by becoming less conductive, and consequently, reduces the voltage contribution by pull-up 128. As a result, the voltage at node 130 decreases which, in turn, causes the voltage of the negative output 111 to decrease.

To provide negative feedback, p-channel devices 125 and 126 are placed in parallel with p-channel devices 123 and 124, respectively. For example, as the positive output 112 increases in voltage, p-channel device 126 is weakened and less conductive. This causes a reduction in the voltage at node 131. This voltage reduction at node 131 strengthens p-channel device 123 by becoming more conductive. This event, along with the effects of p-channel device 125 becoming more conductive due to a decrease in voltage of negative output 111, increases the voltage at node 130.

In summary, the selected sizing of especially the p-channel devices 123–126 influences the operation of stage 110 or any stage. In this embodiment, p-channel devices 123–124 are matched (equivalent), and p-channel devices 125–126 are matched. If p-channel devices 125–126 provide a small amount of negative feedback with respect to the positive feedback applied by p-channel devices 123–124, respectively, the oscillations will be of a greater magnitude and slower frequency. However, if p-channel devices 125–126 provide a substantial amount of negative feedback compared to the positive feedback applied by respective p-channel devices 123–124, the oscillations will be of a smaller magnitude but very fast. It is noted that if p-channel devices 125–126 impose too much negative feedback, differential oscillator 100 will not have a sufficient loop gain and oscillations will not begin. For this embodiment, the following sizing may be used as shown in Table A.

TABLE A

| Device No. | Channel Width | Channel Length |
|---|---|---|
| 120 | 16.16 | 0.48 |
| 121, 122 | 10.96 | 0.48 |
| 123, 124 | 4.80 | 0.48 |
| 125, 126 | 2.96 | 0.48 |

Figure 4:
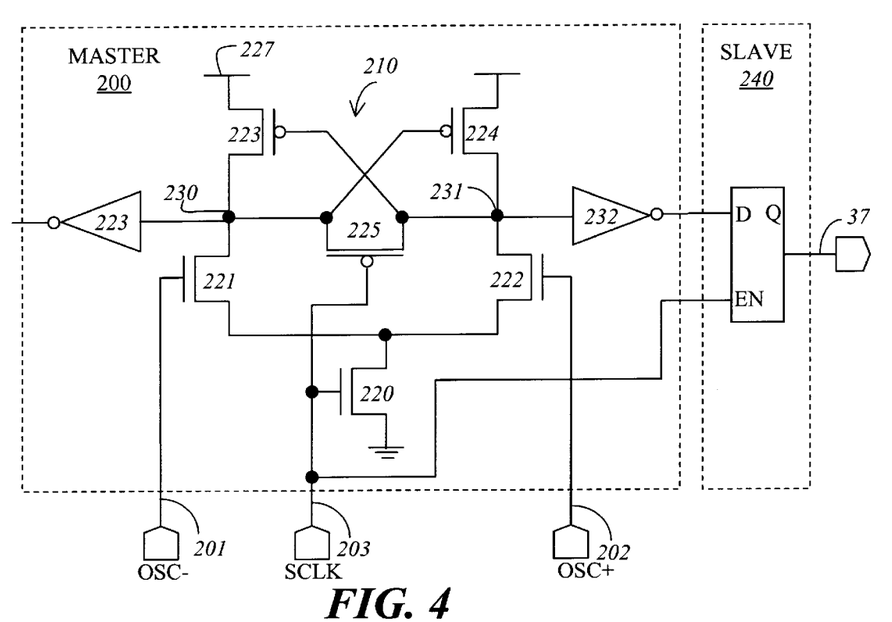
FIG. 4 is an illustrative embodiment of a sampling circuit of FIG. 1.

Referring to FIG. 4, an embodiment of sampling circuit (e.g., sampling circuit 31) is shown. The sampling circuit 31 includes a master device 200 connected to a slave device 240. The slave device 240 outputs a sample signal over a line (e.g., line 37 of FIG. 1). In one embodiment, slave device 240 includes a standard CMOS latch in which a D-input receives a signal from an output master device 200 while an ENABLE input receives a signal from line 38 from VCO 10 of FIG. 1.

As shown, in this embodiment, master device 200 includes a differential sense amplifier 210. This sense amplifier 210 includes a plurality of n-channel devices 220, 221 and 222 and a plurality of p-channel devices 223, 224 and 225. Collectively these devices 220–225 operate as a cross-couple sense amplifier receiving inputs 201–203 of sampling circuit 31. Inputs 201–202 are coupled to the gates of n-channel devices 221 and 222 to receive signals from oscillator 25; namely, the OSC– and OSC+ signals. Input 203 receives the SCLK signal from VCO 10 of FIG. 1.

As a result, when the SCLK signal rises, sense amplifier 210 will sense whether the OSC– signal or the OSC+ signal possesses a greater voltage and will amplify the difference between these input signals. Since sense amplifier 210 has a strong positive leedback due to the cross-coupling between p-channel devices 223 and 224, a sampled value is maintained by sense amplifier 210 even if OSC– and OSC+ signals reverse their polarities from the state in which they were sampled. When the SCLK signal is low at an initialization condition, p-channel device 225 ensures that voltages at nodes 230 and 231 are generally equal to each other. This guarantees that prior potentials at the node do not influence or bias the output.

More specifically, as shown in FIG. 4, in one embodiment of the present invention, n-channel device 220 and p-channel device 225 are influenced by a state of the SCLK signal. When the SCLK signal is generally logic low, n-channel devi(e 220 is off and p-channel device 225 is conductive. This causes voltages at both nodes 230 and 231 to approach a predetermined voltage equivalent to $V_{dd}-V_{th}$, where "$V_{dd}$" is a voltage applied to pull-ups 226 and 227 and "$V_{th}$" is a threshold drop of p-channel device 223 or 224 (if matched). As a result, nodes 230 and 231 are placed at equal voltages during sampling in order to avoid sampling errors from occurring. Furthermore, slave device 240 is disabled.

As the SCLK signal rises to a predetermined voltage level, n-channel device 220 will start conducting (i.e., turning on) and p-channel device 225 is turned off to establish a current path from Vdd to ground (GND). As a result, the difference between voltage of inputs 201–202 will be enhanced (amplified).

For example, as an illustrative example, it is contemplated that the OSC– signal is lesser in voltage than the OSC+ signal. As a result, n-channel device 222 is more conductive than n-channel device 221, thereby pulling the voltage of node 231 lower than the voltage of node 230. Due to the cross coupling of sense amplifier 210, p-channel device 223 becomes more conductive in response to a reduction in voltage at node 231. Consequently, the voltage at node 230 is increased due to greater contribution by pull-up 227. As a result, p-channel 224 becomes less conductive, and consequently, further reduces the voltage at node 231. The selected sizing of especially the p-channel devices 223 and 224 influences the amount of positive feedback applied by the amplifier. One example of selected sizing is set forth in Table B.

TABLE B

| Device No. | Channel Width | Channel Length |
|---|---|---|
| 220 | 1.20 | 0.48 |
| 221,222 | 5.76 | 0.60 |
| 223,224 | 10.56 | 0.52 |
| 225 | 3.20 | 0.40 |

This continues until sampling is completed, at which time, a voltage representing a logic 1 or 0 (being the inverse of the voltage of node 231) is loaded by an inverter 232 into the slave device 240 for output as a random bit. A complementary inverter 233 may be attached to node 230 for balancing purposes. Of course, an opposite condition where OSC– signal is greater in voltage than the OSC+ signal may occur.

Thus, a random number generator has been disclosed which uses a single, relatively low frequency voltage controlled oscillator as a clock (SCLK) signal for sampling the outputs of a plurality of high frequency oscillators. A noise source is used to vary the frequency of the lower frequency oscillator. A differential sense amplifier is used in conjunction with a latch for sampling the high frequency differential signals to provide a more robust random number generator.

Figure 5:
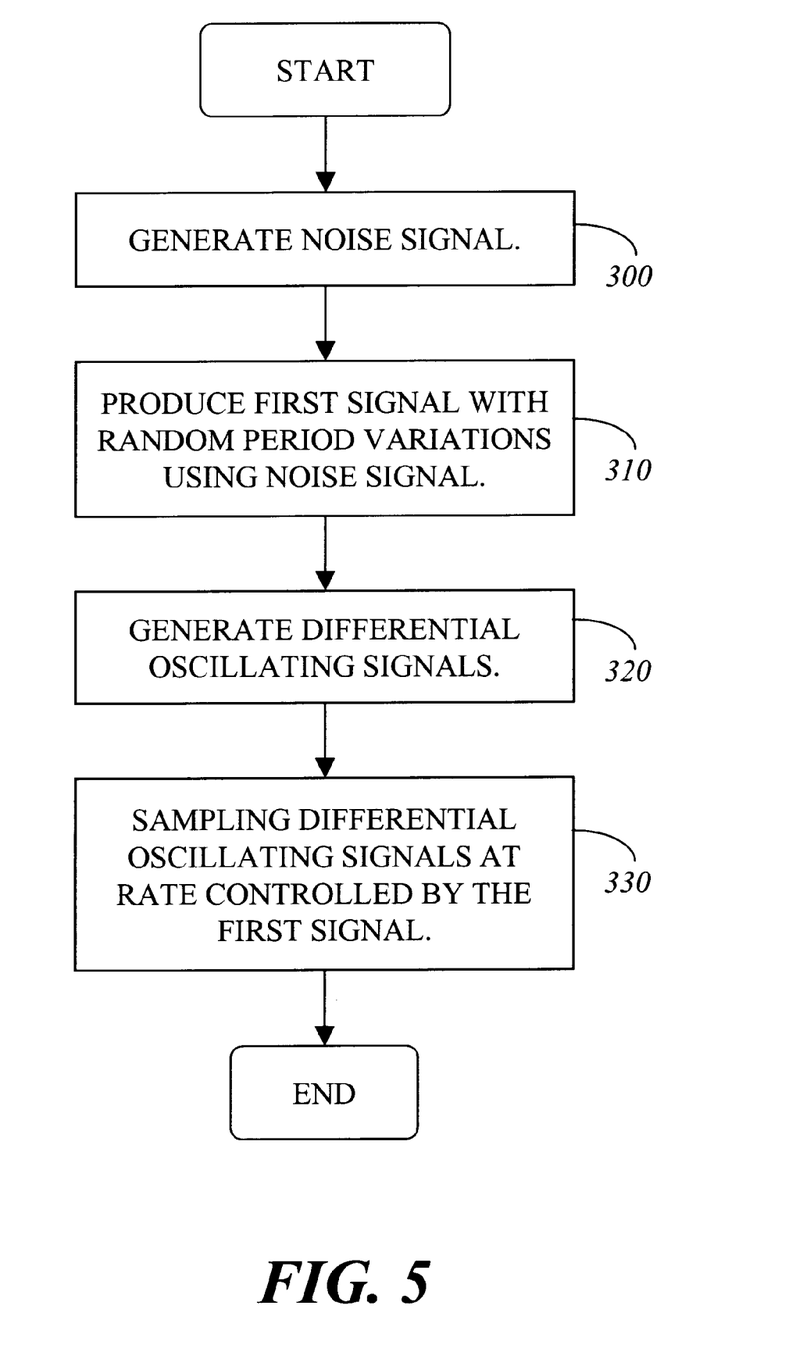
FIG. 5 is an illustrative flowchart of one embodiment of the operational steps of the present invention.

Referring now to FIG. 5, an illustrative flowchart of the operational steps of the present invention independent of a chosen hardware implementation is shown. First, a noise signal needs to be generated (Step 300). Herein, thermal noise from registers 12 and 13 of FIG. 1 are used. However, other noise sources may be utilized. Next, the noise signal is used to produce a first (SCLK) signal having a random variation in period (Step 310). Concurrently with or subsequent to the production of the SCLK signal, high speed differential signals are produced, normally by a differential oscillator (Step 320). Thereafter, these differential samples are sampled at a rate controlled by SCLK signal to produce one or more random bits (Step 330).

Figure 6:
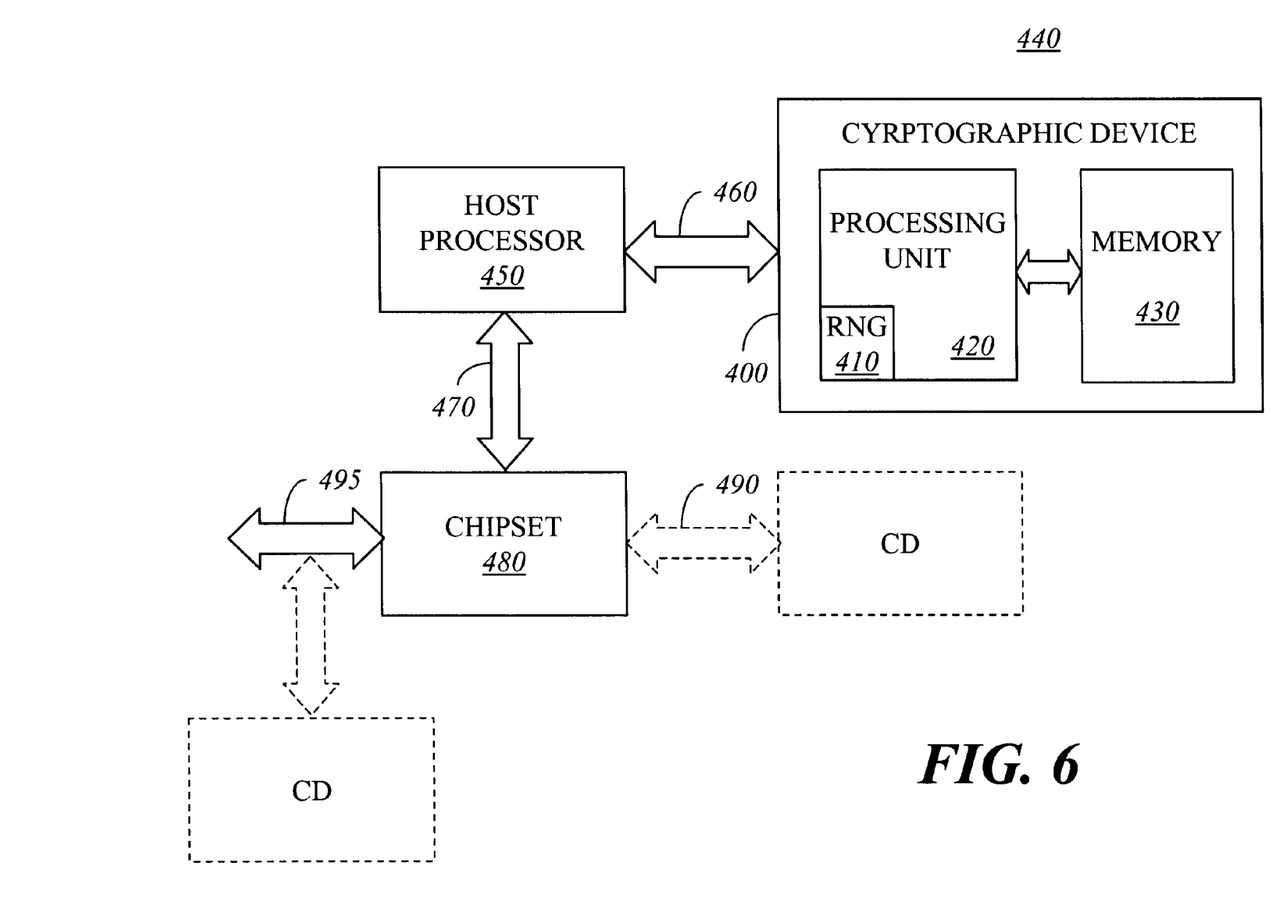
FIG. 6 is an illustrative block diagram of one embodiment of a system implemented with a cryptographic device featuring the present invention.

Referring to FIG. 6, it is contemplated that the random number generator 410 of the present invention may be implemented within a cryptographic device 400. The cryptographic device 400 includes at least (i) a processing unit 420, typically integrated with random number generator 410, and (ii) a memory element 430 in communication with processing unit 420. In this embodiment, the memory element 430 is non-volatile memory (e.g., flash memory) contained in the same package containing processing unit 420.

As shown, within an electronic system 440 (e.g., a computer, peripheral equipment such as a facsimile machine or scanner, etc.), cryptographic device 400 may be interconnected to a host processor 450 via a dedicated bus 460 (as shown) or through a host bus 470. However, as an alternative embodiment, the cryptographic device 400 may be connected to a chipset 480 via a dedicated bus 490 represented by dashed lines. Another alternative embodiment, represented by dashed lines, may involve cryptographic device 400 connected to an input/output bus (e.g., Peripheral Component Interconnect "PCI" bus) 495.

Of course, the invention described herein may be designed in many different methods and using many different configurations for differential oscillators and sampling circuits. While the present invention has been described in terms of various embodiments to facilitate understanding of the present invention, other embodiments may come to mind to those skilled in the art without departing from the spirit and scope of the present invention. The invention should, therefore, be measured in terms of the claims which follow.

What is claimed is:

1. A random number generator comprising:
   a digital waveform source;
   a differential oscillator; and
   a differential sense amplifier controlled by the digital waveform source, the differential sense amplifier to receive an output from the differential oscillator to produce a random bit value.

2. The random number generator of claim 1, wherein the digital waveform source includes
   a source of noise; and
   an oscillator connected to the source of noise.

3. The random number generator of claim 2, wherein the source of noise includes at least one n-well resistor.

4. The random number generator of claim 2, wherein the source of noise includes a voltage divider and at least two n-well resistors.

5. The random number generator of claim 2, wherein the oscillator is a voltage controlled oscillator.

6. The random number generator of claim 1 further comprising:
   at least one differential oscillator in addition to the differential oscillator and at least one corresponding differential sense amplifier connected to the at least one differential oscillator.

7. A random number generator comprising:
   a source of noise;
   an oscillator connected to the source of noise having a nominal first frequency which is varied by the source of noise;
   at least one differential oscillator producing at least two output signals each having a second frequency, the second frequency being higher than the first frequency; and
   a sampling circuit (connected to the oscillator and the differential oscillator, the sampling circuit being capable of sampling a voltage difference between the at least two output signals, under the control of an output of the oscillator.

8. The random number generator of claim 7 wherein the second frequency is at least 10 times the first frequency.

9. The random number generator of claim 7 wherein the sampling circuit includes (i) a master device connected to the at least two output signals from the differential oscillator and (ii) a slave device connected to an output of the master device.

10. The random number generator of claim 9, wherein the master device includes:
    a power terminal;
    a first device including a source connected to the power terminal, a drain connected to a first node, and a gate connected to a second node;
    a second device including a source connected to the power terminal, a drain connected to the second node, and a gate connected to the first node;
    a third device including a drain, a source connected to reference ground and a gate connected to an output of the oscillator;
    a fourth device including a source connected to the drain of the third device, a drain connected to the first node and a gate connected to one of the at least two output signals; and
    a fifth device including a source connected to the drain of the third device, a drain connected to the second node and a gate connected to one of the at least two output signals.

11. The random number generator of claim 10, wherein the master device further includes a sixth device including a source and a drain each uniquely connected to one of the first node and the second node, and a gate connected to the output of the oscillator.

12. The random number generator of claim 11, wherein each of the first device, the second device and the sixth device is a p-channel device.

13. The random number generator of claim 11, wherein each of the third device, the fourth device and the fifth device is a n-channel device.

14. The random number generator of claim 7, wherein the at least one differential oscillator includes a plurality of differential oscillators, each of the plurality of differential oscillator is coupled to a corresponding sampling circuit and connected to the oscillator.

15. The random number generator defined by claim 7, wherein the source of noise includes at least one n-well resistor.

16. The random number generator of claim 7, wherein the source of noise includes a voltage divider and at least two n-well resistors.

17. The random number generator of claim 7, wherein the source of noise provides two separate noise signals connected to the oscillator through an amplifier.

18. A method for generating a random number comprising:
    generating a noise signal;
    using the noise signal to produce a first signal having a nominal frequency of $f1$ with random variations; and
    sampling, at a rate controlled by the first signal, a plurality of signals having a nominal frequency of $f2$ where $f2$ is a higher frequency than $f1$.

19. The method of claim 18, wherein the noise signal is created from thermal noise in at least one resistor.

20. The method of claim 18, wherein the plurality of signals are complementary oscillating signals from a differential oscillator.

21. A system comprising:
a host processor; and
a cryptographic device in communication with the host processor, the cryptographic device including
a processing unit, and
a random number generator integrated on the processing unit, the random number generator including a differential amplifier and a differential oscillator to provide an output to the differential amplifier to produce a random bit value.

22. The system of claim 21, wherein the cryptographic device further including a memory element coupled to the processing unit.

23. The system cf claim 22, wherein the memory element of the cryptographic device is a separate non-volatile memory.

24. The system of claim 21, wherein the cryptographic device is connected to the host processor through one of (i) a host bus and (ii) a dedicated bus.

25. The system of claim 21 further comprising:
a chipset connected to the host processor; and
a bus connected to the chipset and the cryptographic device.

26. The system of claim 21, wherein the random number generator includes
a source of noise; and
an oscillator connected to both the source of noise with differential oscillator.

27. The system of claim 26, wherein the oscillator is a voltage controlled oscillator.

28. A random number generator comprising:
a voltage controlled oscillator;
a differential oscillator; and
a sampling circuit coupled to both the voltage controlled oscillator and the differential oscillator, the sampling circuit to output a random bit value.

29. The random number generator of claim 28, wherein the differential oscillator includes a plurality of cascaded stages to produce a first oscillator signal and a second oscillator signal.

30. The random number generator of claim 29, wherein one of the plurality of cascaded stages includes p-channel devices and n-channel devices to form a cross-coupled differential amplifier.

31. The random number generator of claim 28, wherein the sampling circuit includes (i) a master device connected to the at least two output signal from the differential oscillator and (ii) a slave device connected to an output of the master device.

32. The random number generator of claim 31, wherein the master device includes:
a power terminal;
a first device including a source connected to the power terminal, a drain connected to a first node, and a gate connected to a second node;
a second device including a source connected to the power terminal, a drain connected to the second node, and a gate connected to the first node;
a third device including a drain, a source connected to reference ground and a gate connected to an output of the oscillator;
a fourth device including a source connected to the drain of the third device, a drain connected to the first node and a gate connected to one of the at least two output signals; and
a fifth device including a source connected to the drain of the third device, a drain connected to the second node and a gate connected to one of the at least two output signals.

33. The random number generator of claim 32, wherein the master device further includes a sixth device including a source and a drain each uniquely connected to one of the first node and the second node, and a gate connected to the output of the oscillator.

34. The random number generator of claim 28, further comprising the noise source coupled to the voltage controlled oscillator.

35. A random number generator comprising
means for generating a noise signal;
means for producing a first signal based on the noise signal, the first signal having a first frequency; and
means for sampling, at a rate controlled by the first signal, a plurality of signals having a second frequency, the second frequency being higher than the first frequency.

* * * * *

UNITED STATES PATENT AND TRADEMARK OFFICE
CERTIFICATE OF CORRECTION

PATENT NO.     : 6,061,702
DATED          : May 9, 2000
INVENTOR(S)    : Hoffman

It is certified that error appears in the above-identified patent and that said Letters Patent is hereby corrected as shown below:

Column 5,
Line 59, delete "leedback", insert -- feedback --.

Column 6,
Line 5, delete "devi(e", insert -- device --.

Signed and Sealed this

Eleventh Day of February, 2003

JAMES E. ROGAN
*Director of the United States Patent and Trademark Office*